United States Patent [19]
Perrigault et al.

[11] 4,349,707
[45] Sep. 14, 1982

[54] SYSTEM FOR MEASURING THE ATTENUATION ON A TRANSMISSION PATH

[75] Inventors: Claude Perrigault, Grenoble; Jean-Claude Spitéri, Palaiseau, both of France

[73] Assignee: Compagnie Industrielle des Telecommunications Cit-Alcatel, Paris, France

[21] Appl. No.: 201,690

[22] Filed: Oct. 29, 1980

[30] Foreign Application Priority Data

Oct. 31, 1979 [FR] France .................... 79 27010

[51] Int. Cl.³ .............................................. H04B 3/46
[52] U.S. Cl. ...................... 179/175.31 R; 179/175.3 R
[58] Field of Search ............... 179/175.31 R, 175.31 E, 179/175.3 R

[56] References Cited

U.S. PATENT DOCUMENTS 3,637,954 1/1972 Anderson et al. ......... 179/175.31 E
4,001,525 1/1977 Edwards ..................... 179/175.31 R Primary Examiner—Thomas A. Robinson
Attorney, Agent, or Firm—Sughrue, Mion, Zinn, Macpeak & Seas

[57] ABSTRACT

A system for measuring the attenuation on a transmission path for a random signal in which the propagation time of said signal is between a lower limit T1 and an upper limit T2, the system comprising:

a first maximum value indicator circuit with immediate response and a holding time not less than T2, to which the signal at the input end of said path is applied;

a second maximum value indicator circuit with immediate response and a holding time not less than T2−T1, to which the signal at the output end of said path is applied;

a detector which detects that the output of said first indicator has been maintained constant during a time interval not less than T2, connected to receive the output signal from said first indicator and determining times at which the indicator output signals are recognized; and a processor connected to receive the indicator output signals, controlled by said detector and generating a measurement signal which is a function of the instantaneous value of the ratio of the indicator output signals at the times at which said signals are recognized.

11 Claims, 4 Drawing Figures

SYSTEM FOR MEASURING THE ATTENUATION ON A TRANSMISSION PATH

The present invention concerns a system for measuring the attenuation factor (or, more concisely, the attenuation) on a signal transmission path in circumstances where the transmitted signal is random in that its value is not known accurately in advance.

A specific application of the invention is to telephone transmission systems, to measure the attenuation on the "echo" path on a communication channel incorporating a terminating set connecting a two-wire telephone circuit to a four-wire circuit, for the purpose of, for example, adaptive operation of a half-echo suppressor inserted in the four-wire circuit.

BACKGROUND OF THE INVENTION

As is well known, in a terminating set of a telephone communication channel connecting a two-wire circuit connected to a subscriber telephone set, constituting a two-way transmission channel for that subscriber, and a four-wire circuit, constituting for the subscriber separate transmit and receive channels, there is a stray transmission path from the receive to the transmit channel. Thus part of the signal on the receive channel is retransmitted to the other, distant end subscriber communicating with the first-mentioned, near end subscriber. If the transmission of this part of the signal, known as the echo signal, the stray path being known in the echo path, constitutes a problem, which is the case with very long links over which the distant end subscriber perceives his own words as an echo, and on links in networks using concentrator type systems to reduce traffic throughout, in which circumstances the efficiency of such systems is considerably degraded, the four-wire circuit is fitted with a half-echo suppressor which blocks transmission of an echo signal on the transmit channel in the absence of speech signals from the near end subscriber but permits transmission of a speech signal from the near end subscriber whether or not an echo signal is superimposed on such signals. The four-wire circuit naturally incorporates another half-echo suppressor for the echo signals generated in the terminating set providing the connection between the four-wire circuit and the two-wire circuit connected to the telephone set of the distant end subscriber.

One way of detecting whether a signal present on the transmit channel consists only of the echo signal corresponding to a signal present on the receive channel, or if it also includes speech signals from the near end subscriber, is to compare the level of the signal on the transmit channel with a detection threshold which is a function of the signal level on the receive channel, and to evaluate the attenuation of the echo signal on the transmit channel relative to the signal on the receive channel, which is the attenuation of the echo path between the output (or possibly input) of the half-echo suppressor on the receive channel and the input of the half-echo suppressor on the transmit channel. The real value of this attenuation depends in particular on the specifications of the two-wire circuit connected to the terminating set. This attenuation may vary to a significant extent from one communication channel to another in the same network. Measuring this attenuation in a half-echo suppressor in operation provides for adapting its detection threshold to allow for such variations, so as to obtain sure and fast detection of the presence of a near end subscriber signal superimposed on the echo signal.

To carry out this measurement on the basis of the signals at both ends of the echo path in question, the propagation time on the echo path must be allowed for, as the signals are random in nature. This propagation time or echo delay is a function of the distance between the terminating set and the half-echo suppressor and, in some circumstances, on the specifications of other equipments such as filters on the transmission path. The echo delay varies from one communication channel to another for the same half-echo suppressor and may have a value of up to a few dozen milliseconds. A further factor must be taken into account when making such measurements, in that the near end subscriber speech signal may at certain times (when both subscribers are speaking) be superimposed on an echo signal on the transmit channel.

To overcome this problem, it has already been proposed to detect the maximum absolute values of the signals at both ends of the echo path, in time intervals of the same duration equal to the maximum echo delay, the maximum value detected for each of these signals in each time interval being stored in memory through the next time interval, the system determining at the end of each time interval the ratio of the larger of the two maximum values detected in the interval in question and the preceding interval for the signal at the output end of the echo path and the maximum value detected in the preceding interval for the signal at the input end of that path. The value of this ratio, previously peak limited to values exceeding 1 to minimise error at times when both subscribers are speaking and the distant end subscriber is not speaking, is the estimated value of the complement of the echo path attenuation.

This method generally gives a value less than the real value of the echo path attenuation, even when only the distant end subscriber is speaking.

Preferred embodiments of the present invention enable this attenuation to be measured more accurately without the use of significantly more complex circuitry.

SUMMARY OF THE INVENTION

The present invention provides a system for measuring the attenuation on a transmission path for a random signal in which the propagation time of said signal is between a lower limit T1 and an upper limit T2, the system comprising:

a first maximum value indicator circuit with immediate response and a holding time not less than T2, to which the signal at the input end of said path is applied;

a second maximum value indicator circuit with immediate response and a holding time not less than T2−T1, to which the signal at the output end of said path is applied;

a detector which detects that the output of said first indicator has been maintained constant during a time interval not less than T2, connected to receive the output signal from said first indicator and determining times at which the indicator output signals are recognised; and a processor connected to receive the indicator output signals, controlled by said detector and generating a measurement signal which is a function of the instantaneous value of the ratio of the indicator output signals at the times at which said signals are recognised.

In one embodiment of the invention, the first and second indicators are controlled by a timebase defining successive time intervals of period T and the first indicator outputs, at the end of each period T, the maximum value of the signal which it received from the start of the nth period preceding the period under consideration to the end of the period in question, while the second indicator outputs, at the end of each period T the maximum value of the signal which it received from the start of the mth period preceding the period under consideration to the end of the period in question; where n and m are predetermined non-zero integers such that $n \cdot T \geq T2$ and $2 \cdot n \cdot t - T2 \geq m \cdot T \geq nT - T1$; wherein the detector includes said timebase and the maintenance of the output signal of the first indicator constant between the end of any one of the periods T and the end of the next nth period.

The processor preferably comprises a circuit generating a signal representing the ratio of the signals received from the indicators and an output circuit controlled by said detector and generating said measurement signal. In one embodiment of the invention, said output circuit comprises means for generating a signal which assumes the value of said signal representing the ratio of the signals received from the indicators on each signal recognition time and which does not vary between successive signal recognition times. In another embodiment of the invention, said output circuit comprises a control loop on the output side of said signal generator circuit, controlled by said detector.

In an embodiment of the invention for measuring the attenuation on an echo path of a communication channel on a four-wire telephone circuit, said processor comprises means for disabling said detector when the value of said signal representing the ratio of the signals received from the indicators is not within a range corresponding to the values of the ratio of the signals received from the first and second indicators greater than a predetermined threshold.

Said processor preferably comprises means for disabling said detector when at least one of the signals received from the indicators is not above a predetermined threshold.

BRIEF DESCRIPTION OF THE DRAWINGS

Embodiments of the invention are described by way of example with reference to the accompanying drawings in which.

DESCRIPTION OF PREFERRED EMBODIMENTS

Figure 1:
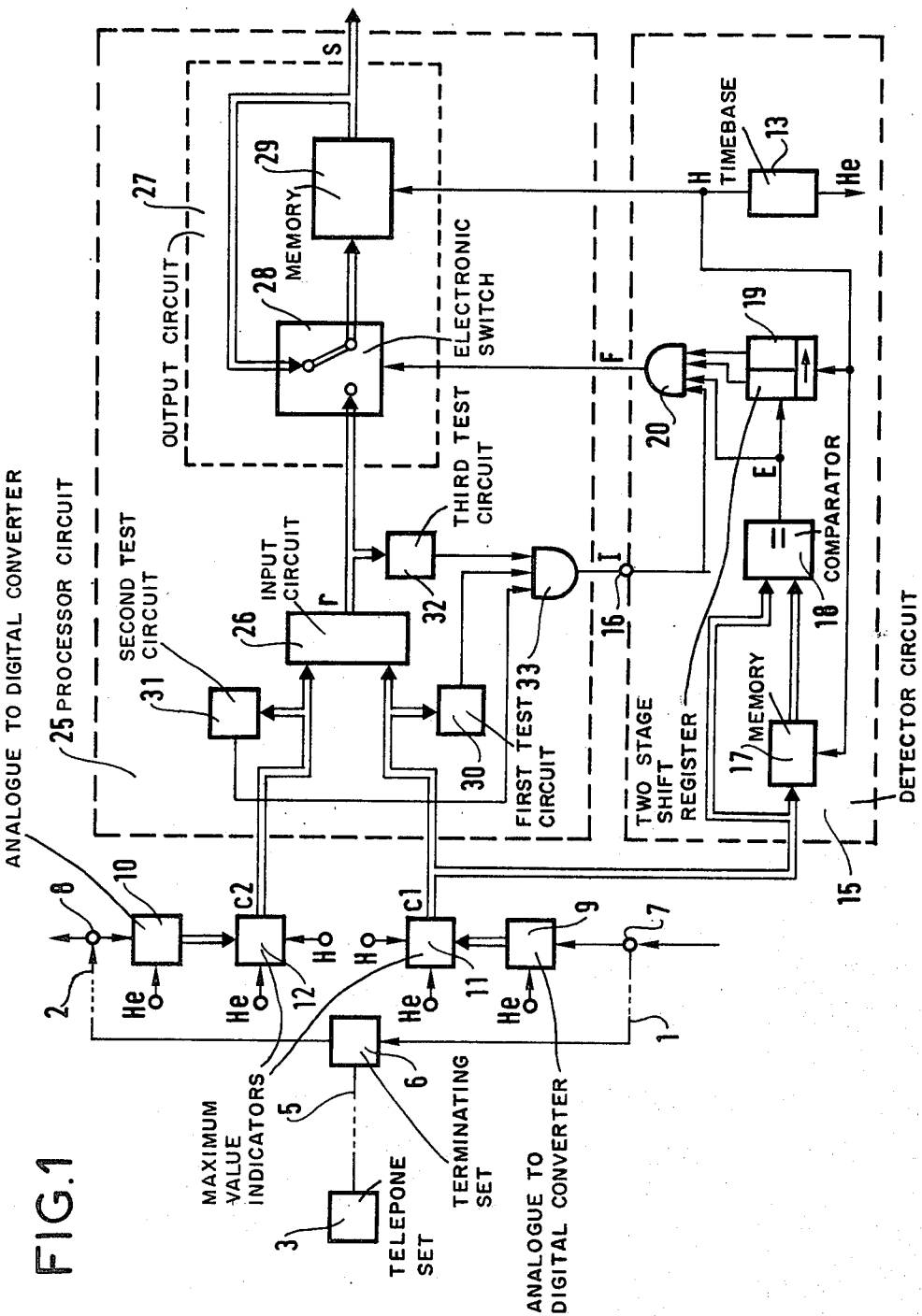
FIG. 1 shows a first embodiment of a measuring system in accordance with the invention.

FIG. 1 shows a measuring system in accordance with the invention as applied to the measurement of the echo path attenuation on a telephone communication channel.

The measuring system shown is connected to a four-wire telephone circuit providing a receive channel 1 and a transmit channel 2 for a subscriber A. The telephone set 3 of subscriber A is connected to the four-wire circuit by a two-wire circuit comprising a two-way transmission channel 5 and a terminating set 6 providing an interface between the two-wire and four-wire circuits. Subscriber A, the near end subscriber, is in communication with a distant end subscriber B whose telephone set is connected to the four-wire circuit at the other end (not shown) of the link, by means of another two-wire circuit and another terminating set.

The measuring system is connected to receive channel 1 and transmit channel 2 at respective access points 7 and 8, at which the signals on these channels are in analogue form. Access points 7 and 8 may be, for example, the output to the receive channel and the input from the transmit channel, respectively, of a half-echo suppressor connected to the four-wire circuit and arranged to prevent transmission to subscriber B of echo signals produced in terminating set 6 when subscriber A is not speaking. The measuring system measures the attenuation on the transmission path from access point 7 to access point 8, extending through terminating set 6, in order to adjust the detection threshold of the half-echo suppressor, in accordance with the measured value. The remainder of the half-echo suppressor is of conventional design and is not shown here as it is not necessary to an understanding of the operation of the measuring system.

Figure 3:
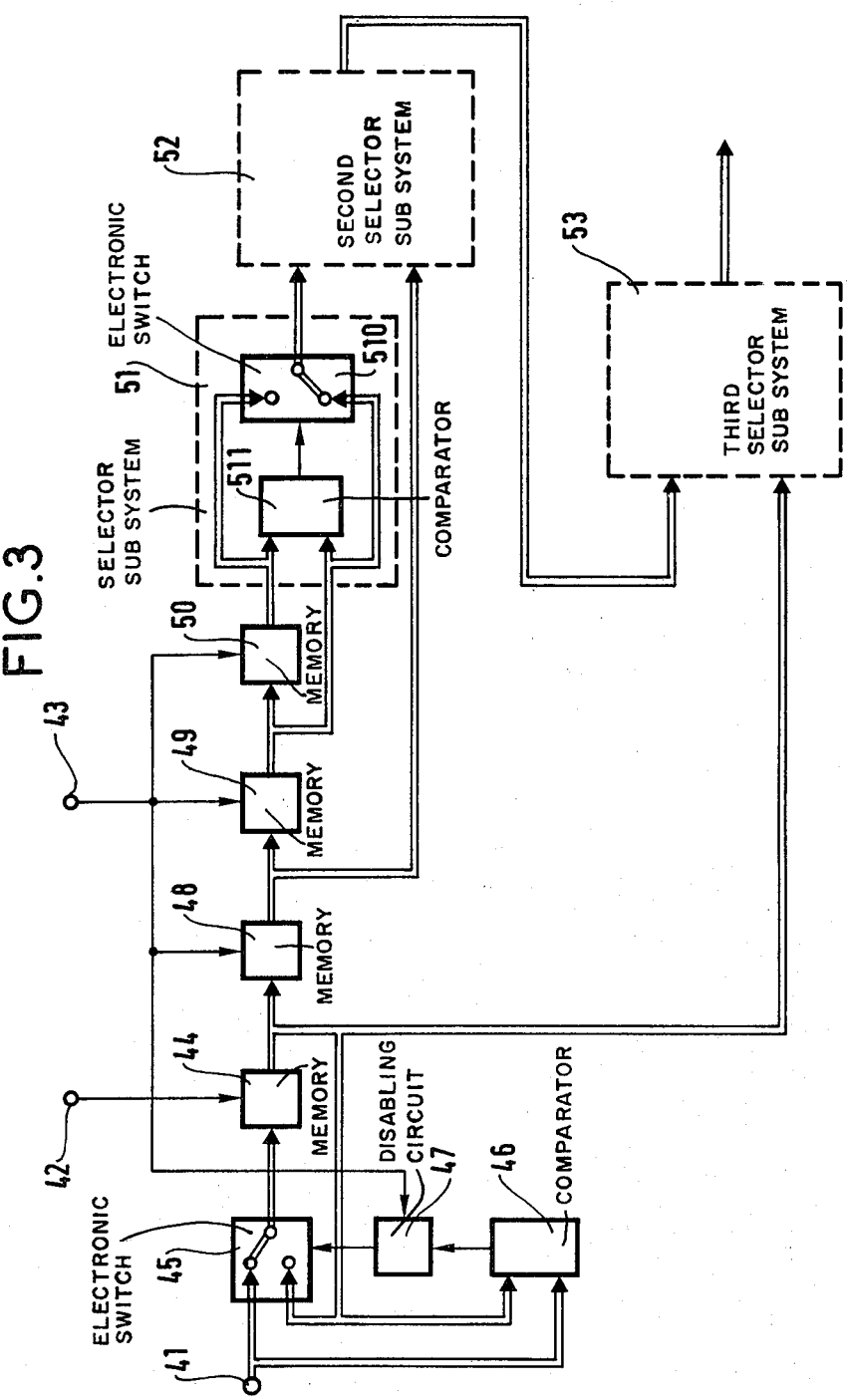
FIG. 3 is a specific embodiment of a maximum value indicator used in the measuring system in accordance with the invention as shown in FIG. 1
Figure 4:
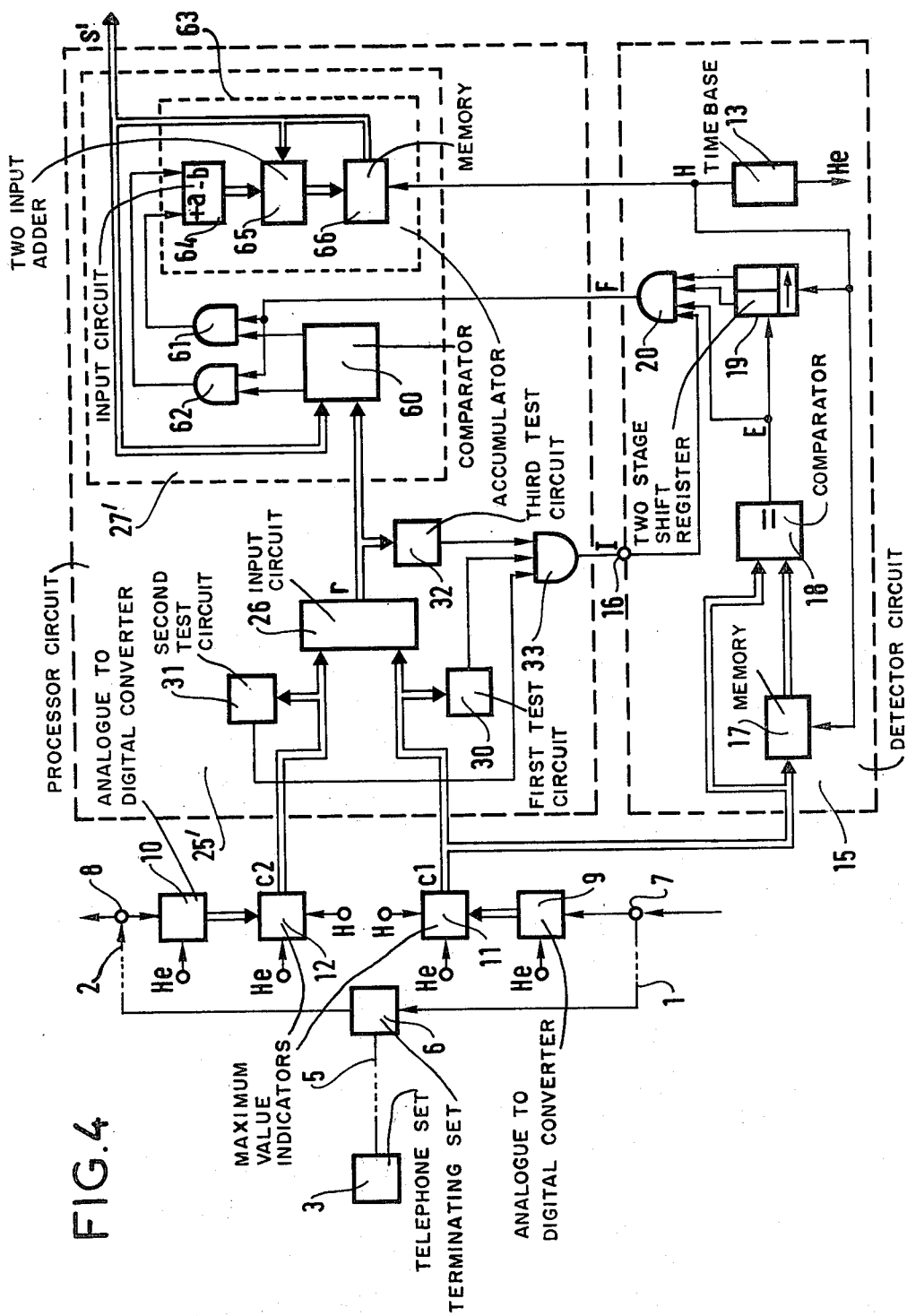
FIG. 4 shows a second embodiment of a measuring system in accordance with the invention.

The measuring system is primarily digital, comprising at its input side two similar analogue-to-digital converters 9 and 10, connected respectively to receive channel 1 at access point 7 and to transmit channel 2 at access point 8. These two converters process the signals on channels 1 and 2, respectively, at a rate controlled by a sampling clock signal He of period Te generated by a timebase 13. The output of each converter carries successive binary words or numbers representing in encoded form the amplitude or absolute value of successive samples of the analogue signal processed, without regard to the polarity or sign of those samples. Each of converters 9 and 10 has a parallel output, comprising a number of output terminals on which the various bits of each code word are available simultaneously. Note that all digital signals within the measuring system shown in FIG. 1 and the circuits shown in FIGS. 3 and 4 are obtained at parallel outputs, transmitted over parallel links and received on parallel inputs. The parallel nature of these inputs, links and outputs will not be specified again. In the diagrams, parallel connections are represented schematically by double lines.

Converters 9 and 10 preferably operate according to a logarithmic conversion law, such that two binary numbers defined by unity represent two absolute values of the signal which are in a predetermined ratio. Each converter may comprise, for example, a linear analogue-to-digital converter to the output of which is connected a linear-logarithmic code converter. Alternatively, each converter could comprise a logarithmic analogue compressor followed by an analogue-to-digital converter operating according to a linear conversion law.

Converters 9 and 10 are connected to respective maximum value indicators 11 and 12, receiving on their respective data inputs the signals on channels 1 and 2 after rectification and digitization by the converters. Indicators 11 and 12 are controlled by a timebase 13 which applies to their respective first clock inputs the sampling clock signal He and to their respective second clock inputs a clock signal H, the period T of which is large relative to the sampling period Te. Indicator 11 outputs a digital signal c1 whose value throughout each period T (and therefore on each sampling period Te) is the maximum value of the signal on the data input of the indicator, which is the maximum absolute value of the signal on receive channel 1, from the start of the nth preceding period T to the time in question, where n is a non-zero integer. Indicator 12 outputs a digital signal c2, the value of which throughout each period T is the maximum value of the signal on its data input, that is to say the maximum absolute value of the signal on transmit channel 2, from the start of the mth preceding period of the time in question, where m is a non-zero integer.

Figure 2:
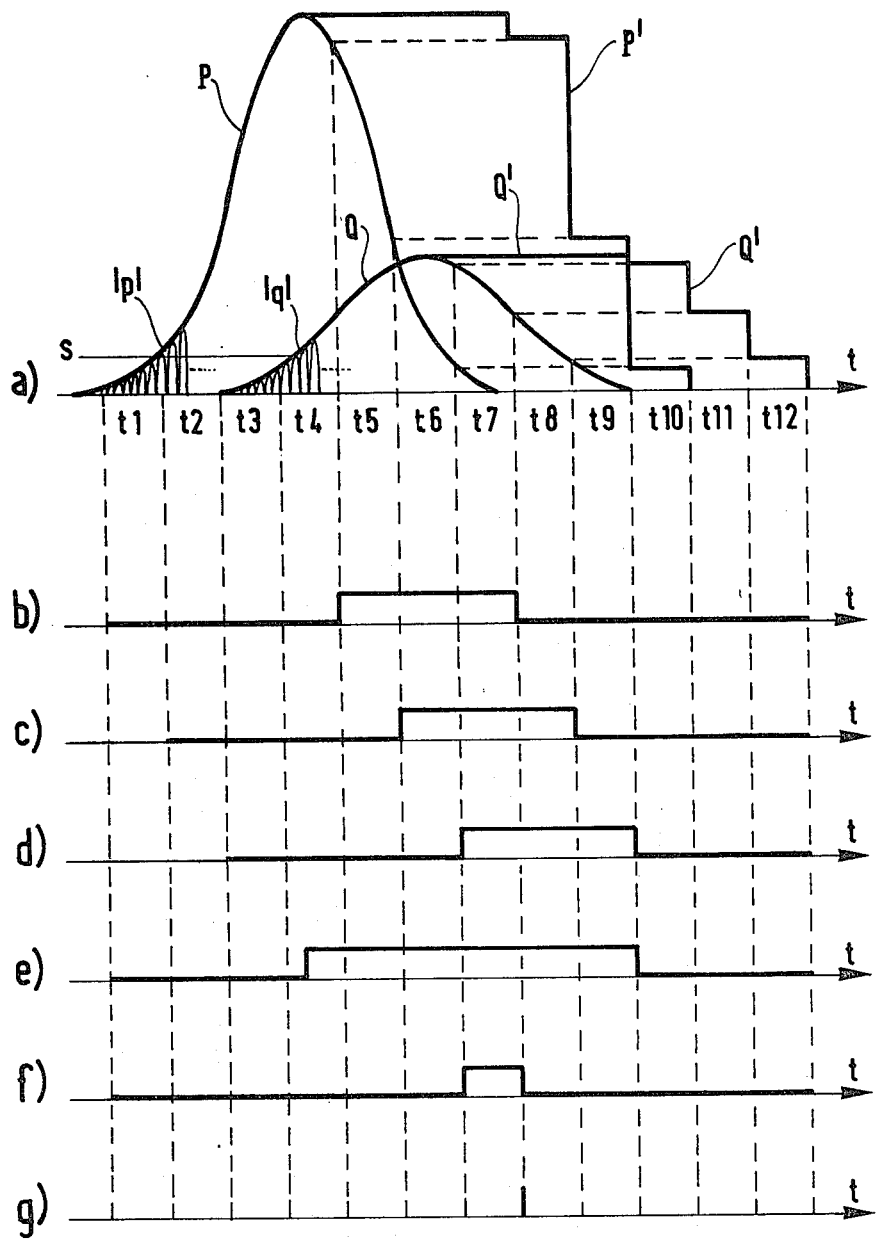
FIG. 2 comprises timing diagrams intended to facilitate the understanding of the operation of the measuring system shown in FIG. 1.

As will be seen more clearly with reference to FIG. 2, indicator 11 thus has a holding time between n·T and (n+1)·T. After the signal on the data input of indicator 11 drops below an initial value, and provided that it remains below that value, signal c1 remains at this initial value for a period between n·T and (n+1)·T. Thus the data input signal falling and remaining below the initial value does not decrease the value of signal c1. The precise duration of this holding period depends on the time within a period T at which the input signal value drops below the initial value. Indicator 11 responds immediately to the signal on its data input rising above the value of signal c1, any such rise being immediately followed by signal c1.

Similarly, indicator 12 provides a holding period between m·T and (m+1)·T and an immediate response.

The propagation time on the echo path from access point 7 on the receive channel to access point 8 on the transmit channel is known as the echo delay. Its value is not known precisely but is between a lower limit T1 and an upper limit T2. The values of n and m and T are such that the product n·T is not less than T2 (preferably approximately equal to T2) and the product m·T is not less than n·T−T1 and not more than 2·n·T−T2 (in practice, not more than n·T). For an echo delay between 0 and 25 ms and identical indicators 11 and 12 for which, for example, n=m=3 (these values will be assumed throughout the remainder of this description), it is advantageous to select T=8.75 ms, corresponding to 70 sampling periods each of duration 125 μs.

Signal H comprises, for example, positive pulses each of the same duration as the sampling period Te. This signal is derived in timebase 13 by a conventional circuit (not shown) from signal He using a divide by 70 circuit (for this specific numerical example) consisting of a counter which counts the pulses of signal He and a decoder responsive to a specified one of the 70 possible output states of the counter.

A specific embodiment of indicators 11 and 12 will be described later with reference to FIG. 3.

Referring again to FIG. 1, connected to the output of indicator 11 is a detector 15 which detects the maintenance of the signal c1 constant from the end of any period T to the end of the nth (in this example the third) succeeding period T. Detector 15 incorporates timebase 13 and has a disable input 16 connected to circuitry 25 for processing signals c1 and c2. Processor 25 is connected to the respective outputs of indicators 11 and 12 and provides at its output a digital signal s which is the output signal of the measuring system and whose value depends on the relative values of signals c1 and c2 at specific times (defined by detector 15) at which signals c1 and c2 are recognised. Processor 25 also outputs a logic signal I to disable input 16 of detector 15, which is prevented from operating when signal I has the appropriate value (0 in this instance).

Detector 15 further comprises a memory 17 with a data input connected to the output of indicator 11 and a control input connected to receive clock signal H. It stores the value of signal c1 at the end of each period T until the end of the next period T, the stored value being available at its output.

Detector 15 further comprises a comparator 18 with a first input connected to the output of indicator 11 and a second input connected to the output of memory 17. It compares the instantaneous value of signal c1 in each period T with the value of this signal at the end of the preceding period T. Its output signal E is at 1 or 0 (in this example) according to whether the values compared are equal or not equal.

Detector 15 further comprises a two-stage (n−1=2) shift register 19 with a data input connected to the output of comparator 18 and a load and shift control input connected to receive clock signal H. It stores the value of signal E at the end of each period T until the end of the next but one period T. Shift register 19 has two outputs, one for each of its two stages.

Finally, detector 15 comprises an AND gate 20 with four inputs connected to the output of comparator 18, the outputs of register 19 and disable input 16. When detector 15 is not disabled (signal I on input 16 at level 1), the output signal F of AND gate 20 indicates whether or not signal c1 has or has not been of constant value since the end of the third preceding period T. This indication is present throughout each period T and thus at the end of each period T. When detector 15 is disabled, signal F is maintained at level 0.

Memory 17 comprises a number of parallel-connected type D bistables (not shown) recording respective bits of a binary word encoding the value of signal c1. Comparator 18 may comprise a set of parallel-connected exclusive-OR gates (not shown) comparing respective bits of the code word on the D inputs of the bistables constituting memory 17 and the code word contained in those bistables, connected to an AND gate (not shown) providing the logical product of the output signals of the exlusive-OR gates.

The output signal F of AND gate 20 and clock signal H are applied to control inputs of processor 25. These two signals determine the times at which signals c1 and c2 are recognised, on the basis of which processor 25 generates the measuring system output signal s. These times occur at the ends of periods T at which signal F is at the 1 level, or in other words, at the ends of periods T for which signal c1 has remained constant since the end of the third preceding period T without detector 15 being disabled.

Processor 25 comprises a circuit 26 with two inputs connected to respective outputs of indicators 11 and 12 and generating a digital signal r representing the ratio of signals c1 and c2.

It further comprises an output circuit 27 connected to the output of circuit 26 and controlled by detector 15, its output signal having the value r on each c1 and c2 recognition time and remaining constant between successive such times, the output signal of circuit 27 constituting the measuring system output signal s.

Processor 25 further comprises first and second test circuits 30 and 31 with inputs connected to respective outputs of indicators 11 and 12, producing an output signal whose value is 1 or 0 (in this example) according to whether the signal c1 or c2 it monitors exceeds or does not exceed a predetermined comparison threshold.

A third test circuit 32 of processor 25 has an input connected to the output of circuit 26 and generates an output signal whose value is 1 or 0 (in this example) according to whether the value of signal r is or is not within a specified range constituted by values above a predetermined threshold R (the value of signal r according to this example being the ratio of signal c1 and signal c2).

Finally, processor 25 comprises an AND gate 33 with three inputs connected to the outputs of circuits 30, 31 and 32. Its output signal I is applied to disable input 16 of detector 15, which is disabled when signal r does not exceed threshold R and thus when at least one of signals c1 and c2 does not exceed the comparison threshold.

The output circuit 27 comprises an electronic switch 28 with two inputs and one output, and a memory 29. Memory 29 has a data input connected to the output of switch 28 and a data output connected to a first input of switch 28, the second input of which is connected to the output of circuit 26. Switch 28 is controlled by signal F so as to connect its output to its first or second input according to whether the value of signal F is 0 or 1. Memory 29 is controlled by clock signal H to store, until the end of the next period T, the value at the output of switch 28 at the end of each period T, (in other words, the value of signal r) or the last value previously written into this memory, according to whether signal F is at 1 or 0 at the end of period T in question. The stored value is transferred to its output. Thus memory 29 is written with the value of signal r at each c1/c2 recognition time and this value is retained in memory 29 until the next recognition time, so that the output of memory 29 is the signal s.

The respective comparison thresholds for signals c1 and c2 in test circuits 30 and 31 are substantially equal to the maximum absolute value of the background noise on receive channel 1 or send channel 2, respectively. In this example the comparison thresholds for signals c1 and c2 are the same, hereinafter designated S. The threshold R in respect of signal r is in this example equal to 1. This detector 15 is disabled when signal c1 is not greater than signal c2. Note that the disabling of detector 15 by test circuits 30, 31 and 32 is intended to prevent the generation of an incorrect measurement signal during periods when the distant end subscriber B is not speaking, and to limit or eliminate the error which may occur in the measurement signal during periods when both subscribers A and B are speaking.

As the values of signals c1 and c2 are encoded according to a logarithmic law, circuit 26 comprises a simple subtractor with its plus input connected to the output of indicator 11 and its minus input connected to the output of indicator 12. It therefore subtracts from the binary word or number encoding the value of signal c1 the binary word or number encoding the value of signal c2. The resulting number is the coded value of signal r, which is thus greater than, equal to or less than 1, according to whether the resulting number is positive, null or negative. The values of signals c1 and c2 are encoded on d bits (d=4, for example), so that the value of signal r is encoded on (d+1) bits, one of which bits is a sign bit with the value 1 or 0, according to whether the number is positive or not positive, for example.

Memory 29 may, for example, consist of a number of D type bistables (not shown) connected in parallel to store respective bits of the number provided by subtractor 26, except for the sign bit which there is no need to store. The numbers provided by the subtractor at the c1/c2 recognition times are always positive as a result of detector 15 being disabled by test circuit 32.

Switch 28 comprises a data select switch or multiplexer, consisting of a set of logic gates which, under the control of signal F, apply to the D inputs of the bistables constituting memory 29 either the bits of the number provided by subtractor 26 (excluding the sign bit) or the bits stored in the respective bistables.

Each of test circuits 30 and 31 comprises a digital comparator which compares the binary number encoding the value of signal c1 or c2 and the binary number encoding the value of threshold S, provided by a source which is not shown in the diagram.

In practice, test circuit 32 is reduced to a simple connection between the terminal of subtractor circuit 26 carrying the sign bit and the appropriate input of AND gate 33.

Note that memories 17 and 29 and the stages of register 19 operate in synchronism, that is to say that the data written into these memories and register stages on each control pulse (on the rising edges of signal H pulses and marking the end of a period T, for example) are those present at the input immediately prior to the appearance of the command pulse.

Note also that signal values on receive channel 1 and transmit channel 2 below threshold S are of no special interest with regard to the attenuation measurement, so that converters 9 and 10 could effect a certain degree of peak limiting of the signals on these channels by using the same number to encode all signal values less than or equal to the threshold S. The output signals of converters 9 and 10 and therefore signals c1 and c2 would thus always be greater than or equal to threshold S. In this case (which is not shown in the diagram) test circuit 30 would not be required. If signal c1 did not exceed threshold S, signal c2 could not be other than greater than or equal to signal c1, and detector 15 would be disabled by the sign bit from subtractor circuit 26.

In the measuring system shown in FIG. 1, the value of n has been taken as 3, by way of example. Note that for values of n greater than 3 it would be sufficient to substitute for shift register 19 a shift register with n−1 stages and to replace AND gate 20 with another AND gate (or equivalent) providing the logical product of the output signal of comparator 18, the signal on input 16 and the output signal from each stage of the shift register. For n=2, register 19 would be replaced by a single bistable and AND gate 20 by a three-input AND gate. For n=1, register 19 would not be required and AND gate 20 would be replaced by another AND gate providing the logical product of the signal on input 16 and the signal at the output of comparator 18.

The operation of the measuring system shown in FIG. 1 will now be described with reference to FIG. 2.

Referring to FIG. 2, the curves show signals at various points in the measuring system in the situation where only the distant end subscriber is speaking.

Curve (a) shows the envelope P of the rectified speech signal p of the distant end subscriber on receive channel 1. It also shows the envelope Q of the rectified signal q on transmit channel 2, this signal q constituting the echo generated by signal p.

Time intervals t1 to t12 are successive periods T in chronological order. Envelopes P and Q each comprise a rising edge and a falling edge which join at the maximum which occurs in period t4 in the case of envelope P and in period t6 in the case of envelope Q. The echo delay is in this case substantially equal to twice the period T.

Ignoring the quantification introduced by converters 9 and 10, curve (a) also shows the output signals c1 and c2 of indicators 11 and 12, respectively, corresponding to signals p and q. Also shown is threshold F. The value of signal c1 throughout each period T is the maximum absolute value of signal p since the start of the third preceding period. It is represented by the rising edge of envelope P and dashed line P' starting from the maximum of envelope P and descending in successive steps. The first step is at the maximum value of envelope P and extends from the time at which this maximum occurs to the end of period t7. Its duration is the holding time of indicator 11. Each of the other steps extends over one period T.

Similarly, the value of c2 in each period T is the maximum absolute value of signal q since the start of the third preceding period. It is represented by the rising edge of envelope Q and dashed line Q' which starts from the maximum on envelope Q and descends in successive steps, the first of which starts at the maximum value of envelope Q and extends from the time at which this maximum occurs to the end of period t9 (holding time of indicator 12), the remaining steps each extending over one period T.

Curves (b), (c), (d), (e) and (f) show the output logic signals of comparator 18, the first and second stages of shift register 19, AND gate 33 and AND gate 20 (signal F), respectively. The times at which signals c1 and c2 are recognised are represented on curve g by the pulses (in this instance a single pulse) of clock signal H which cause the value of signal r to be written into memory 29.

Until the end of period t4, the value of signal c1 in a period T is always greater than the value of this signal at the end of the preceding period, so that the output signal of comparator 18 is at 0. At the end of period t4, the maximum value of rectified signal p (the value of signal c1) is written into memory 17. The output signal of the comparator goes to 1, where it remains for as long as signal c1 retains the same value, that is to say until the end of period t7. The output signal of comparator 18 then returns to 0, where it remains, signal c1 then decreasing in value from one period to the next.

The output signals of the first and second stages of register 19 reproduce the output signal of comparator 18 with a period T and two periods T time delay, respectively. There is thus only one period (t7) during which these three signals are simultaneously at 1. As the output signal of AND gate 33 is at 1 during this period, signals c1 and c2 both exceed s and signal c1 exceeds signal c2, signal F at the output of AND gate 20 is at 1 from the start to the end of period t7. It is at 0 during the other periods.

As a result, switch 28 connects the input of memory 29 to the output of circuit 26 only during this period t7, the instantaneous value of signal r being written into this memory at the end of period t7, the content of memory 29 remaining unmodified for the remaining interval.

Thus signals c1 and c2 are recognised for the purpose of evaluating the attenuation on the echo path only at a time when their respective values are the respective maximum absolute values of signals p and q (the distant end subscriber speech signal on the receive channel and the corresponding echo signal on the send channel, the value obtained for the attenuation being the ratio of the maximum values.

In the example shown in FIG. 2, the echo delay is approximately 2 T. Nevertheless, it will be appreciated that for any value of this delay between 0 and 3 T the maximum absolute values of signal p and its echo signal q would be present at the output of the respective indicators at the end of period t7. The value selected for period T (8.75 ms) is such that the product 3·T is at least equal to the largest expected value (25 ms) of the echo delay, so that under all circumstances, the maximum absolute values of signal p and its echo signal q would be present at the outputs of the respective indicators at the end of period t7.

On a more general level, it will also be appreciated that with values for n and m other than 3 for the indicators associated with the receive and transmit channels, respectively, a similar result would be obtained, namely the existence at a particular time, consisting in the end of a period T and characterised by a constant level from the end of the nth preceding period T of the output signal of the indicator associated with the receive channel, at which, whatever the value of the echo delay between a lower limit T1 and an upper limit T2, the maximum values of signal p and its echo signal q would be present at the output of the respective indicators, provided that the values n and m and period T meet the previously discussed conditions: $n \cdot T \geq T2$ and $m \cdot T \geq n \cdot T - T1$. Note that the third of the aforementioned conditions ($m \cdot T \leq 2 \cdot n \cdot T - T2$) provides for preventing, in the event that successive c1/c2 recognition times are close together, comparison of the output signals of the two indicators at a given c1/c2 recognition time on maximum values which correspond, through an excessive value of the holding time for the transmit channel indicator.

Thus as already indicated, test circuits 30, 31 and 32 prevent the value of the measurement signal being modified outside periods when the distant end subscriber B only is speaking, or at least minimise the error to which this signal may then be subject.

Should the near end subscriber A begin to speak while subscriber B is still speaking, the output signal c2 of indicator 12 (initially less than the output signal c1 of indicator 11) generally exceeds signal c1 relatively quickly, the signal on transmit channel 2 then comprising the speech signal of subscriber A and the echo of the speech signal of subscriber B. This causes test circuit 32 to disable detector 15, the output signals of test circuits 30 and 31 being at level 1. In many cases, signals c1 and c2 will not be recognised until this has occurred. However, in certain cases the condition that signal c1 be maintained constant for a period exceeding three periods T will occur during the time interval in which signal c2 is below c1. This will cause the instantaneous value of signal r to be written into memory 29. Nevertheless, the value written in such circumstances will be greater than unity, which limits the error to which the measurement is subject, and its value will be altered the next time the distant end subscriber only is speaking.

When only the near end subscriber A is speaking, signal c2 is greater than signal c1 and detector 15 is disabled by test circuit 32 (and also by test circuit 30, receive channel 1 carrying only background noise). The value of the measurement signal is not modified.

When neither subscriber A or B is speaking, receive channel 1 and transmit channel 2 carrying only background noise, detector 15 is disabled by test circuits 30 and 31 and measurement signal s retains its previous value. Note that test circuit 31 provides for disabling detector 15 when, in the absence of speech signals from either subscriber A or B, signal c1 from indicator 11 rises above threshold S as a result of impulsive noise on receive channel 1 without signal c2 from indicator 12 exceeding threshold F. Thus the noise pulse, whose frequency spectrum is wholly outside the speech band, is not transmitted to transmit channel 2.

FIG. 3 shows a specific embodiment of indicator 11 (or 12) of the system shown in FIG. 1.

The indicator has a data input 41 and two clock inputs 42 and 43. The term "input signal" will hereinafter refer to the signal applied to input 41, being the output signal of converter 9 (or 10) of the system shown in FIG. 1.

Sampling signal He on input 42 controls the loading of a memory 44 with a data input connected to the output of an electronic switch 45 with two inputs and one output. The first input of switch 45 is connected to input 41 of the indicator. The second input of this switch is connected to a data output of memory 44.

A comparator 46 has two inputs connected to input 41 of the indicator and to the output of memory 44, respectively. It compares successive values of the input signal with the successive contents of memory 44, generating a logic signal which controls switch 45 through a disabling circuit 47. According to whether the value of the input signal is greater than the content of memory 44 or not, this logic signal connects the output of switch 45 to its first or second input.

Signal H on input 43 controls disabling circuit 47 so as to disable the output signal of comparator 46 and force the connection of the output of switch 45 to its first input during a memory 44 load command pulse at the beginning of each period T.

Thus the instantaneous value of the input signal is written into memory 44 at the start of each period T. The disabling circuit 47 is inoperative for the remainder of this period. Thus when comparator 46 indicates that the instantaneous input signal value is greater than the value contained in memory 44, the output of switch 45 is connected to its first input and the aforementioned instantaneous value is written into memory 44 on the next control pulse of signal He. On the other hand, when the instantaneous value of the input signal is not greater than the value contained in memory 44, the output of switch 45 is connected to its second input and the content of memory 44 is not modified on the next command pulse of signal He.

Thus throughout each period T, memory 44 contains the maximum value of the input signal between the start of the period in question and the time in question. At the end of each period T, memory 44 contains the maximum value of the input signal during that period.

The output logic signal from comparator 46 is at level 1 or level 0 (for example) according to whether the value of the input signal is greater than or not greater than the value contained in memory 44. Signal H is thus formed, as already mentioned with reference to FIG. 1, of pulses at logic level 1, each of the same duration as the sampling period Te, so that disabling circuit 47 may comprise a simple OR gate. If memory 44 is responsive to the rising edges in its controlling clock signal He (for example), the pulses of signal H will each extend, for preference, from one falling edge of signal He to the next.

Memory 44 may comprise, for example, a number of parallel-connected type D bistables storing respective bits of a binary number encoding the input signal value.

Switch 45 comprises a data selector switch or multiplexer comprising a set of logic gates under the control of the output signal of comparator 46, received through the disabling circuit 47. These gates apply to the D inputs of the bistables constituting memory 44 either the bits of the number defining the input signal value (present on input 41) or the respective bits stored in these bistables.

Comparator 46 is a digital comparator which compares the binary number encoding the instantaneous value of the input signal and the binary number stored in the bistables constituting memory 44.

The maximum value indicator shown comprises three further memories ($n=3$ or $m=3$) 48, 49 and 50, connected in cascade to the output of memory 44. Memories 48 to 50 are similar to memory 44 and are loaded under the control of signal H so that at the end of each period T, the content of memory 44 is transferred into memory 48, that of memory 48 into memory 49 and that of memory 49 into memory 50. At the end of each period T, memory 44 contains the maximum value of the input signal for that period, so that memories 48 to 50 store, at the end of each period T, the maximum values of the input signal for the preceding three periods T.

The outputs of memories 49 and 50 are connected to respective inputs of a selector subsystem 51 which selects the larger of the two values contained in memories 49 and 50 (or their common value if equal). Subsystem 51 comprises an electronic switch 510 with two inputs, one connected to the output of memory 49 and the other to the output of memory 50. The value selected appears at its output. Switch 510 is similar to switch 45 and is controlled by a comparator 511 which is also part of subsystem 51, receiving on its input the values stored in memories 49 and 50, and switching the output of switch 510 to its first or second input, according to whether the value in memory 49 is greater than or not greater than that in memory 50. A second selector subsystem 52 similar to subsystem 51 (and therefore not shown in detail in the diagram) is connected to the output of subsystem 51 and also to the output of memory 48. It selects the greater of the two values applied to its inputs by these two circuits. The value selected by subsystem 52 is thus the largest of the three values contained in memories 48, 49 and 50. This value is in turn input to a third selector subsystem 53, similar to the preceding two selector subsystems, connected to receive also the value contained in memory 44.

Thus the output of selector subsystem 53, constituting the output of the indicator, carries the largest of the values stored in memories 44, 48, 49 and 50. Thus throughout each period T, this output carries the largest value of the input signal from the start of the third preceding period T to the time in question.

On a more general level, to obtain throughout each period T the largest value of the input signal from the start of the nth (or mth) preceding period to the time in question, it is sufficient to connect, on the output side of memory 44, n (or m) memories controlled by signal H and n (or m) selector subsystems.

The operation of the indicator shown in FIG. 3 will not be described in more detail here, as this circuit is of a type known in the art. Specifically, it is described in French patent application No. 77 02 992 published under the No. 2 340 198.

FIG. 4 shows an alternative embodiment of the invention, using the same references for components also shown in FIG. 1. The system of FIG. 4 will not be described in detail, the following description being limited to points in which it differs from the system in FIG. 1.

In the measuring system as shown in FIG. 4, the processor 25 of the system shown in FIG. 1 is replaced by a processor 25' in which an output circuit 27' generating output signal s' is substituted for output circuit 27 generating measurement signal s.

Output circuit 27' comprises a control loop connected to the output of circuit 26, its operation being controlled by logic signal F and clock signal H from detector 15. It outputs measurement signal s' which is available in digital form at the output of the system. The control loop comprises a comparator 60, a first AND gate 61, a second AND gate 62 and an accumulator 63.

Comparator 60 has a first input connected to the output of circuit 26 and a second input connected to the output of the system. It generates on a first output a logic signal at level 1 or 0 according (in this example) to whether the signal on its first input is greater than or not greater than the signal on its second input. On its second output it generates a logic signal at level 1 or 0 according to whether the signal on its first input is less than or not less than the signal on its second input.

AND gate 61 has a first input connected to the first output of comparator 60 and a second input connected to receive signal F from detector 15. Its output is at level 1 only when the signal on the first input of comparator 60 is greater than the signal on its second input with signal F at level 1.

AND gate 62 has a first input connected to the second output of comparator 60 and a second input connected to receive signal F. Its output signal is thus at level 1 only when the signal on the first input of comparator 60 is less than the signal on its second input and signal F is at level 1.

Accumulator 63 has a clock input receiving signal H, an increment input connected to the output of AND gate 61 and a decrement input connected to the output of AND gate 62. Its output constitutes the output of the measurement system, carrying the digital measurement signal s'.

Accumulator 63 contains a number d which represents (in encoded and possibly truncated form—see below) the value of measurement signal s'. This number is increased by a fixed positive increment a when at the end of a period T logic 1 is present on the increment input (that is to say, when signal r is greater than signal s' at a c1/c2 recognition time). It is decreased by a fixed positive decrement b when at the end of a period T logic 1 is present on its decrement input (that is to say when signal r is less than signal s at a c1/c2 recognition time). It is not otherwise modified. Note that it is not possible for level 1 to be present simultaneously on both the increment and decrement inputs.

To this end, the accumulator comprises an input circuit 64, a two-input adder 65 with one output, and a memory 66. The two inputs of circuit 64 are connected to the increment and decrement inputs, respectively, of the accumulator, its output being connected to a first input of adder 65 carrying increment a in response to level 1 on the increment input, decrement b in response to level 1 on the decrement input and a null increment in response to level 0 on both the increment and decrement inputs. Memory 66 has a data input connected to the output of adder 65, a clock input receiving signal H and a data output connected to the second input of adder 65 and to the output of the accumulator. It stores the result provided by adder 65 at the end of each period T, until the end of the next period T. This result is the value d. Like memory 29 of output circuit 27 in FIG. 1, memory 66 operates in synchronism with shift register 19 and memory 17.

As logarithmic encoding is used, incrementing number d by a and decrementing it by b correspond respectively to multiplying the ratio represented by number d by a fixed factor greater than 1 and dividing it by a fixed factor greater than 1.

To give an example, suppose that the value of signal r is encoded by a four-bit binary number where the bits have respective weights $2^0$ to $2^3$, where $2^0$ corresponds to a ratio of $\sqrt{2}$. Increment a may be chosen as $\frac{1}{4}$ ($2^{-2}$) and decrement b as 1 ($2^0$). Under these conditions, the number d may be defined on six bits, with weights from $2^{-2}$ to $2^3$, all of which are applied to the first input of adder 65 but only the four most significant bits of which appear at the output of the accumulator to define the value of measurement signal s'.

In the numerical example under consideration, input circuit 64 outputs the binary number 0000.01 in response to level 1 on the increment input or binary number 1111.00 in response to level 1 on the decrement input of accumulator 63 (increment b being defined, for example, by the $2^4$'s complement of b so as to use an addition operation instead of a subtraction, as is common practice). Input circuit 64 outputs the binary number 0000.00 in response to level 0 on each of the increment and decrement inputs of accumulator 63.

In practice, the input circuit reduces to simple connections between the increment input and the $2^{-2}$ line of the first input of adder 65 and between the decrement input and each of lines $2^3$ to $2^0$ of the first input of adder 65, the $2^{-1}$ line of this first input receiving a 0 level continuously.

Memory 66 comprises a number of bistables connected in parallel and storing respective bits of number d.

Digital comparator 60 receives the number encoding the value of signal s and the number encoding the value of signal r, in practice with the exception of the sign bit of this last number which need not be input to comparator 60, for the same reason as it is not input to switch 28 of output circuit 27 in FIG. 1.

In a wholly equivalent variation on this arrangement, detector 15 could be disabled when at least one of signals c1 and c2 is less than or equal to threshold S or when signal r is not greater than 1, by applying directly to each of AND gates 61 and 62 (or their equivalents), which would have the necessary additional inputs, the output signal of AND gate 33 or each of the output signals from test circuits 30, 31 and 32, gate 33 being omitted in this case and AND gate 20 then receiving only the output signals of comparator 18 and the stages of register 19.

The substitution of the control loop 27' (FIG. 4) for the sampling and disabling system constituted by output circuit 27 (FIG. 1) largely eliminates oscillations around a mean value of signal r, constituting the required attenuation value, at successive c1/c2 recognition times in periods at which only the distant end subscriber B is speaking, when the echo signal on the transmit channel is not a faithful copy of the signal on the receive channel generating it. This arrangement also minimises or eliminates the momentary error which could otherwise occur as a result of impulse noise at times when only the distant end subscriber B is speaking, and minimises or eliminates such error during times when both subscribers A and B are speaking. At the outset of communications between subscribers A and B, measurement signal s' represents the attenuation on the echo path between terminal points 7 and 8 for the last communication channel to use the four-wire circuit to which the measuring system is connected. This attenuation could become, for example, larger (or smaller) than that for the echo path of the communication channel between subscribers A and B on the first c1/c2 recognition times at the start of communications between subscribers A and B, signal r being less than (greater than) signal s' for at least the majority of these times. The content of accumulator 63 would then increase (decrease) until measurement signal s' converged towards the value of the attenuation on the echo path for the communication channel between subscribers A and B. Measurement signal s' would then remain constant or fluctuate to only a minor extent. It will be understood that if the attenuation on the echo path for the communication channel between subscribers A and B is similar to that for said last used channel, the content of accumulator 63 would be only slightly modified during the call.

With the values specified previously as typical for increment a and decrement b, measurement signal s' converges quickly in the case of an echo path with low attenuation being used subsequently to an echo path with high attenuation, and more slowly in the opposite case. This choice is justified by the fact that, within the context of the intended application of the attenuation measurement system, namely adjustment of the detection threshold of a half-echo suppressor, it is better to utilise a value smaller than the actual attenuation value than a larger value.

Each of the measurement systems described hereinabove is suitable for time-sharing utilisation, measuring the attenuation on the echo path of communication channels through different four-wire circuits to which the system would be connected sequentially. Additional memories would be required to temporarily store the data in respect of paths not being processed. Note that in these circumstances, while the indicators would each operate at rate 1/Te for each path, all the circuitry on the output side of the indicators could operate at the rate 1/T for each path, the signals output by the respective indicators for each path being each sampled at the rate 1/T before application to this output section of the circuitry.

While specific embodiments of the invention have been described hereinabove, it will be appreciated that modifications may be made thereto and certain means replaced by technically equivalent means without departing from the scope of the invention. In particular, it would be possible to use maximum value indicators of another type, for example of the constant holding time and immediate response type, providing at the end of the constant holding time the larger of the instantaneous value of the signal analysed and the held value, attenuated by a predetermined factor. The two indicators would then for preference be identical, with a holding time at least equal to period T2. The type of maximum value indicator described, although in practice advantageous as it permits the use of small values for n and m, does not require that period T be large relative to sampling period Te.

Moreover, although in practice it would be less efficient, the analogue signals at the opposite ends of the echo path could be converted to digital form at the input to the measurement system, using a linear conversion law, for example, the circuit generating signal r then being based on a digital divider. If the signals at the opposite ends of the echo path are already in digital form, then the analogue-to-digital converters are naturally superfluous. If these signals are encoded using a pseudo-logarithmic law, as is generally the case, it is beneficial to insert a pseudo-logarithmic/logarithmic code converter at the input or output of each of the maximum value indicators. This would permit the implementation of a measuring system in accordance with the invention using analogue technology for the memories, comparators, switching circuits and computing circuits.

The invention is not limited to the measurement on a four-wire telephone circuit of the attenuation of an echo path through a terminating set connecting the four-wire circuit to a two-wire telephone circuit. It can also be used, for example, in a loudspeaking telephone set to measure the attenuation of the accoustic echo path, which is the transmission path from the receive channel, terminating at the loudspeaker, to the transmit channel, starting from the microphone. This path exists due to acoustic coupling from the loudspeaker to the microphone. On a more general level, the invention is applicable to the measurement of the attenuation on the transmission path between the input and the output of a two-port electrical network in operation, that is to say a network to the input of which is applied a random signal. The invention provides for making such measurements without requiring a special test signal to be superimposed on said random signal.

We claim:

1. A system for measuring the attenuation on a transmission path for a random signal in which the propagation time of said signal is between a lower limit T1 and an upper limit T2, the system comprising:
    a first maximum value indicator circuit with immediate response and a holding time not less than T2, to which the signal at the input end of said path is applied;
    a second maximum value indicator circuit with immediate response and a holding time not less than T2−T1, to which the signal at the output end of said path is applied;
    a detector which detects that the output of said first indicator has been maintained constant during a time interval not less than T2, connected to receive the output signal from said first indicator and determining times at which the indicator output signals are recognized; and
    a processor connected to receive the indicator output signals, controlled by said detector and generating a measurement signal which is a function of the instantaneous value of the ratio of the indicator output signals at the times at which said signals are recognized.

2. A system according to claim 1, wherein the first and second maximum value indicators are controlled by a timebase defining successive time intervals of period T; the first maximum value indicator outputs, at the end of each period T, the maximum value of the signal which it has received from the start of the nth period preceding the period under consideration to the end of the period in question while the second maximum value indicator outputs, at the end of each period T, the maximum value of the signal which it has received from the start of the mth period preceding the period under consideration to the end of the period in question; wherein n and m are predetermined non-zero integers such that $n \cdot T \geq T2$ and $2 \cdot n \cdot T - T2 \geq m \cdot T \geq n \cdot T - T1$; and wherein said detector includes said timebase and detects the maintenance of the output signal of the first indicator constant between the end of any one of the periods T and the end of next nth period.

3. A system according to claim 1, for measuring the attenuation on an echo path of a communication channel on a four-wire telephone circuit, wherein said processor includes means for disabling said detector when the signal received from the first indicator is not greater than the signal received from the second indicator.

4. A system according to claim 1, wherein said processor comprises a circuit generating a signal representing the ratio of the signals received from the indicators and an output circuit controlled by said detector and generating said measurement signal.

5. A system according to claim 4, for measuring the attenuation on an echo path of a communication channel on a four-wire telephone circuit, wherein said processor comprises means for disabling said detector when the value of said signal representing the ratio of the signals received from the indicators is not within a range corresponding to the values of the ratio of the signals received from the first and second indicators greater than a predetermined threshold.

6. A system according to claim 4, wherein said output circuit comprises means for generating a signal which assumes the instantaneous value of said signal representing the ratio of the signals received from the indicators on each signal recognition time and which then does not vary until the following signal recognition time.

7. A system according to claim 4, wherein said output circuit comprises a control loop on the output side of said generator circuit, controlled by said detector.

8. A system according to claim 7, wherein said loop comprises an accumulator whose content defines the value of said measurement signal and a comparator comparing said signal representing the ratio of the signals received from the indicators and the measurement signal, co-operating with said detector to control incrementing of the content of the accumulator when said signal representing the ratio of the signals received from the indicators is greater than the measurement signal at a signal recognition time and incrementing the content of the accumulator when said signal representing the ratio of the signals received from the indicators is less than the measurement signal.

9. A system according to claim 1, wherein said processor comprises means for disabling said detector when at least one of the signals received from the indicators is not above a predetermined threshold.

10. A system according to claim 1, wherein the two indicators are identical.

11. A system according to claim 1, wherein its components utilize digital technology.

* * * * *